United States Patent
Romacly

(10) Patent No.: US 8,100,622 B2
(45) Date of Patent: Jan. 24, 2012

(54) ARTICULATED LIFT ARM

(75) Inventor: Glenn A. Romacly, Apple Valley, CA (US)

(73) Assignee: Rainbow Conversion Technologies, LLC, Huntington Beach, CA (US)

( * ) Notice: Subject to any disclaimer, the term of this patent is extended or adjusted under 35 U.S.C. 154(b) by 102 days.

(21) Appl. No.: 12/698,476

(22) Filed: Feb. 2, 2010

(65) Prior Publication Data

US 2011/0188978 A1    Aug. 4, 2011

(51) Int. Cl.
 *B65G 65/23*    (2006.01)
(52) U.S. Cl. ........ 414/408; 414/421; 414/425; 414/555; 414/719; 414/739
(58) Field of Classification Search .................. 414/408, 414/409, 421, 425, 548, 549, 555, 719, 734, 414/739, 741, 743
See application file for complete search history.

(56) References Cited

U.S. PATENT DOCUMENTS

| | | | |
|---|---|---|---|
| 1,352,396 A * | 9/1920 | Bailey | 65/300 |
| 3,058,606 A * | 10/1962 | Chalich et al. | 414/415 |
| 3,244,304 A * | 4/1966 | Pollak, Jr. et al. | 414/421 |
| 4,057,156 A * | 11/1977 | Thompson et al. | 414/408 |
| 4,419,041 A * | 12/1983 | Rose | 414/739 |
| 4,427,333 A | 1/1984 | Ebeling | |
| 4,546,233 A * | 10/1985 | Yasuoka | 219/125.1 |
| 4,669,940 A | 6/1987 | Englehardt et al. | |
| 4,978,268 A * | 12/1990 | Winwood et al. | 414/409 |
| 5,002,450 A * | 3/1991 | Naab | 414/303 |
| 5,044,863 A | 9/1991 | LaBass et al. | |
| 5,360,310 A | 11/1994 | Jones et al. | |
| 5,391,039 A | 2/1995 | Holtom | |
| 5,769,594 A | 6/1998 | Kalua | |
| 7,390,159 B2 | 6/2008 | Rimsa et al. | |
| 2005/0002764 A1* | 1/2005 | Pruteanu et al. | 414/408 |
| 2007/0069087 A1 | 3/2007 | Mumm | |
| 2007/0077135 A1 | 4/2007 | Harsch et al. | |

* cited by examiner

*Primary Examiner* — Scott Lowe
(74) *Attorney, Agent, or Firm* — Walter A. Hackler

(57) ABSTRACT

An articulated lift aim assembly for a refuse receptacle generally includes an engaging device for releasably grasping the receptacle, an extendable boom along with an articulated arm mechanism interconnecting the book and the engaging device. A gear arrangement provides for coupling the boom and the arm for raising the arm mechanism with respect to the boom, rotating the arm mechanism with respect to the boom during raising of the arm mechanism and inverting the engaging device and receptacle during raising of the arm mechanism. A gravity operated hook is provided for latching the receptacle when the receptacle is inverted to prevent undesired release from the engaging device.

16 Claims, 4 Drawing Sheets

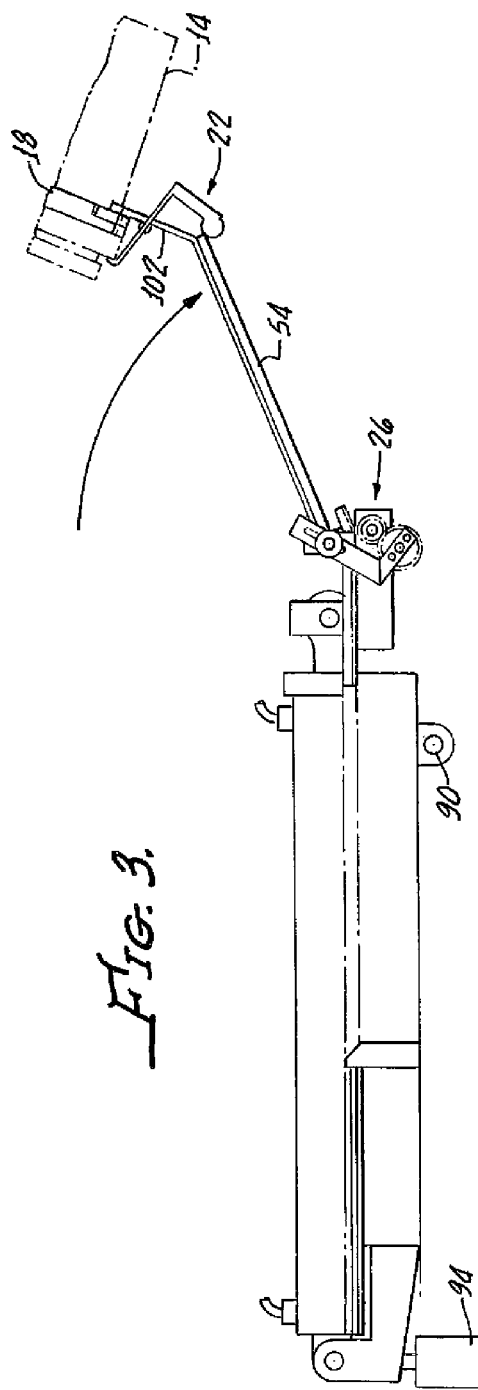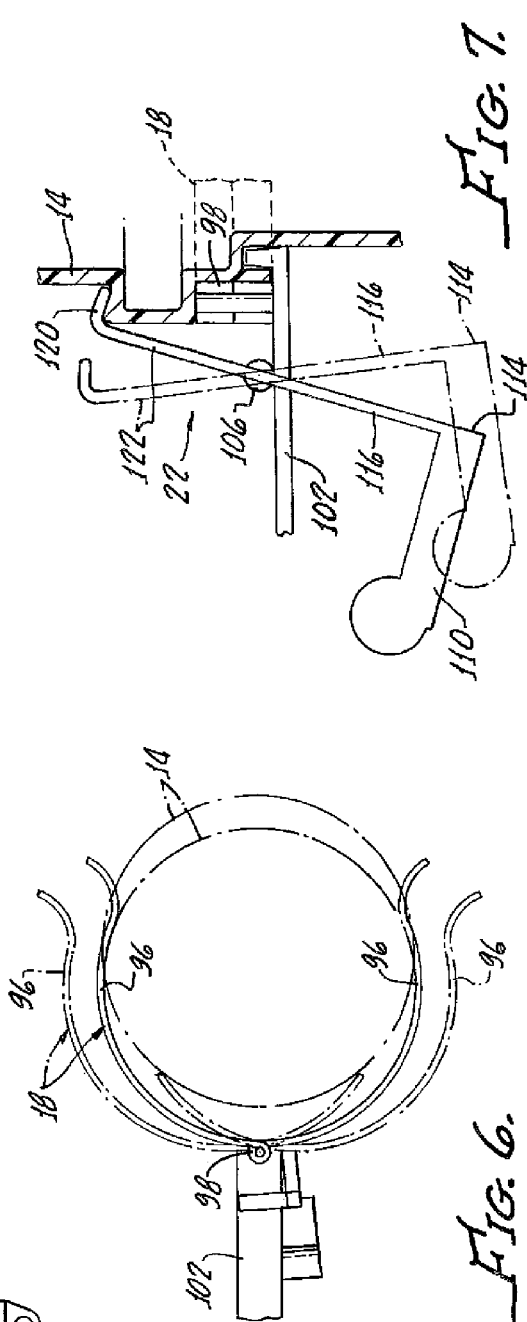

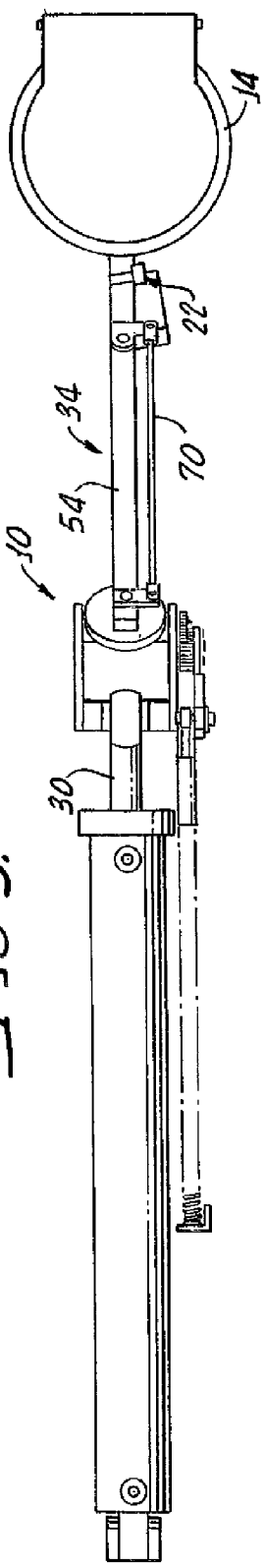
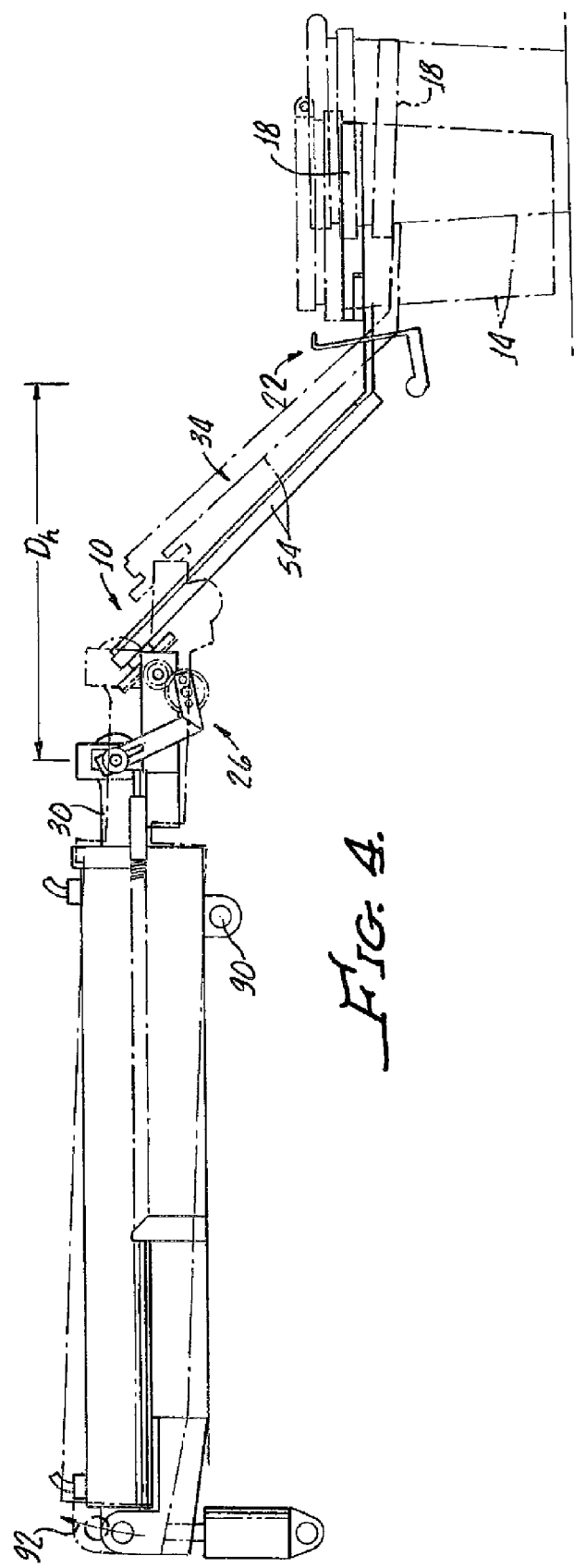

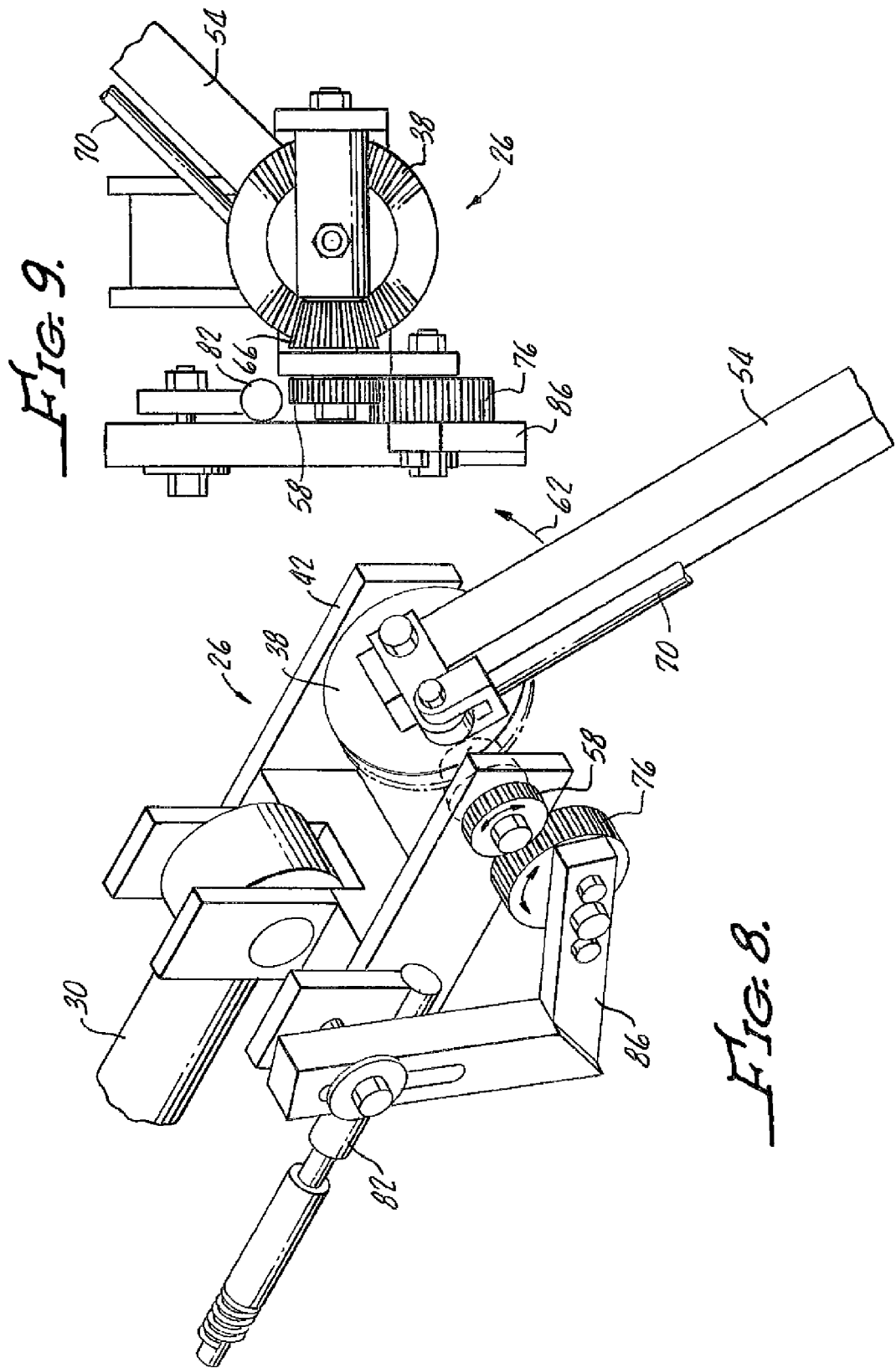

ARTICULATED LIFT ARM

The present invention is generally related to mechanized material handling devices and is more particularly directed to an articulated lift arm assembly for a refuse receptacle.

Labor intensive collection of waste and recyclable materials over the years has become increasingly automated. In that regard, the types of containers in which disposables are situated at collection points are of various designs for assistance in the collection of the materials.

Many mechanized handling devices have been developed to automate the collection of waste materials which include receptacle holding and grasping devices that are commonly connected to an arm which, in turn, is connected to a collection vehicle. Thus, the arm and grasping device are operated to engage, lift, and dump a receptacle into a collection vehicle in or bin.

Inversion of the receptacle is necessary for the emptying thereof and a problem that arises with many automated trash collection trucks is that in order for the grasping device, or grapple, to keep the can from dropping, it must maintain a very tight grip on the receptacle, and if the receptacle is tightly packed by a customer, this pressure may not allow the receptacle to completely empty.

The present invention provides for an articulated lift arm assembly for refuse receptacle along with a gravity operated hook for latching the receptacle when the receptacle is inverted. Thus, grapples, or latching devices, need not maintain a tight grip on the receptacle during the operation.

SUMMARY OF THE INVENTION

An articulated lift arm assembly for a refuse receptacle generally includes an engaging device for releasably engaging a receptacle, an extendable boom and an articulated arm mechanism interconnecting the boom and the engaging device.

A gear arrangement is provided which couples the boom and the arm for raising the arm mechanism with respect to the boom, rotating the arm mechanism with respect to the boom during raising of the arm mechanism, and inverting the engaging device and receptacle during raising of the arm mechanism.

A gravity operated hook is provided for latching the receptacle when the receptacle is an inverted to prevent the undesired release of the receptacle from the engaging device.

Preferably, the hook is pivotably mounted to the arm and includes an elongate member with a weight on one end of the elongate member and a bend at another end of the elongate member for engaging the receptacle.

The weight extends outwardly from the elongate member in a direction opposite to a bending direction of the bend.

More particularly, the gear arrangement includes a crown gear disposed at a distal end of the boom and fixed to a transverse axis and rotatable about a crown gear axis. An arm of the articulated arm mechanism is fixed to the crown gear and a drive gear is provided for rotating a transverse axis with the crown gear for raising the arm.

In addition, a sun gear is provided and fixed to the transverse axis for engaging an rotating the crown gear with the arm upon rotation of the transverse axis. A levered gear is provided for rotating the drive gear.

The articulated arm mechanism includes a forearm hinged to a distal end of the arm and the gear mechanism further includes an inverting rod disposed in a parallel relationship with the arm and fixed to the forearm and the crown gear axis for causing translational movement of the inverting rod, with respect to the arm as the arm is rotated and inversion of the forearm. Thus, the arm mechanism translates the refuse receptacle sideways so that the assembly can be mounted to the front of a trash truck, the back of a front loader bin, or any place else that arm would normally be located on a trash truck.

BRIEF DESCRIPTION OF THE DRAWINGS

The advantages and features of the present invention will be better understood by the following description when considered in conjunction with the accompanying drawings in which:

FIG. 3 is an illustration of the arm shown in FIG. 1 during operation;

FIG. 4 is yet another view of the arm shown in FIGS. 1 and 3 in a further stage of operation;

FIG. 5 is a top plan view of the arm shown before lifting, rotating, and inverting;

FIG. 6 is a plan view of an engaging device suitable for use in the present invention showing grips in both open and closed positions for grasping a receptacle;

FIG. 7 is an enlarged view of a gravity operated hook for latching the receptacle;

FIG. 8 is an enlarged view of the gear arrangement in accordance with the present invention; and FIG. 9 is a bottom view of the gear arrangement in accordance with the present invention taken along a line 9-9 in FIG. 1 and illustrating a crown gear, a drive gear, and a sun gear.

DETAILED DESCRIPTION

Figure 1:
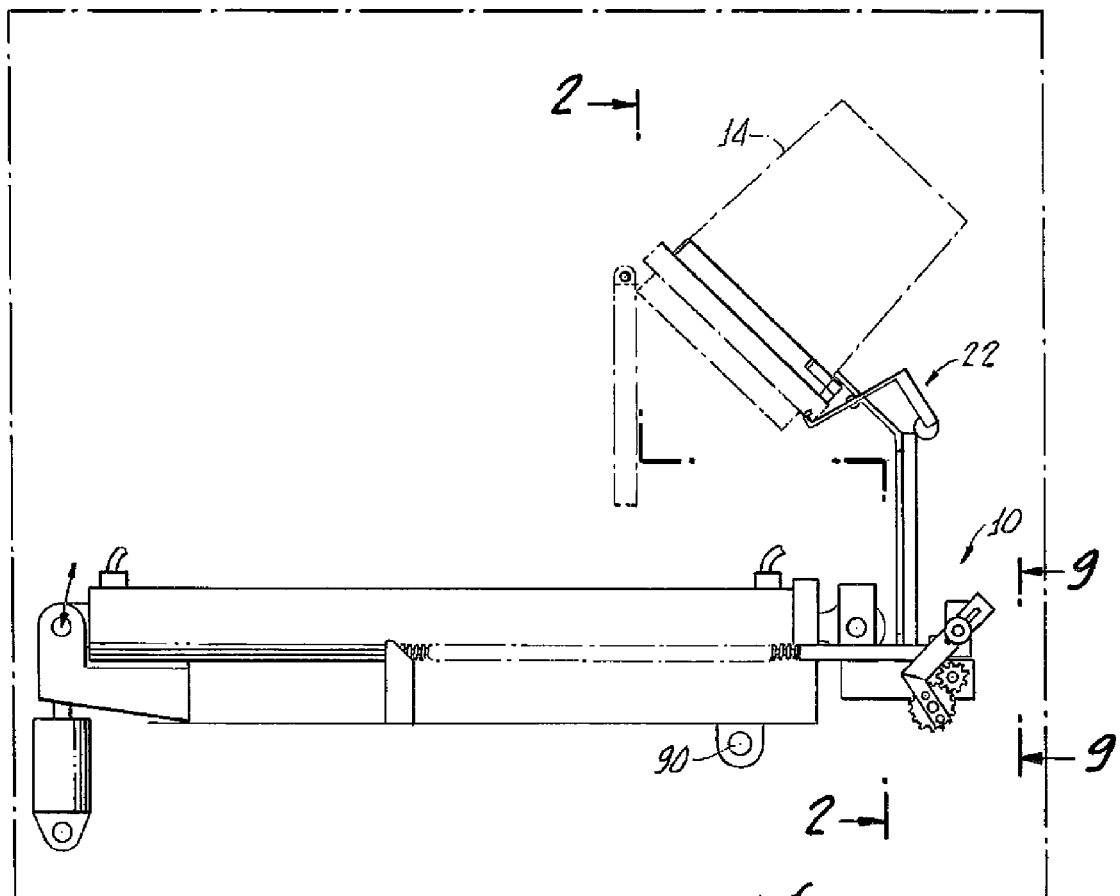
FIG. 1 is a side view of an articulated lift arm assembly in accordance with the present invention generally showing an engaging device for releasably grasping a receptacle, an extendable boom, an articulated arm mechanism interconnecting the boom and engaging device, and a gear arrangement coupling the boom and the arm is provided for raising the arm mechanism with respect to the boom, rotating the arm mechanism and inverting the receptacle.

With reference to FIGS. 1-5, there is shown an articulated lift arm assembly 10 for a refuse receptacle 14 which generally includes an engaging device 18 for releasably grasping the receptacle 14. As more clearly illustrated in FIG. 6, the engaging device 18 is shown in both a closed or grasping position, in solid line, and an open position, in broken line. It should be appreciated that any suitable grasping device may be utilized with the present invention particularly when used with a gravity operated hook 22, described in greater detail hereinafter, for latching a receptacle 14 when the receptacle 14 is inverted to prevent undesired release of the receptacle from the engaging device 18. Thus, the engaging device 18 need not grasp the receptacle 14 to the extent that elimination waste therefrom is impeded when the receptacle 14 is inverted.

With reference to FIGS. 1-5 and 8-9, a gear arrangement 26 couples an extendable boom with an articulated arm mechanism 34 which, in turn, interconnects the boom 30 and the engaging device 18.

Figure 2:
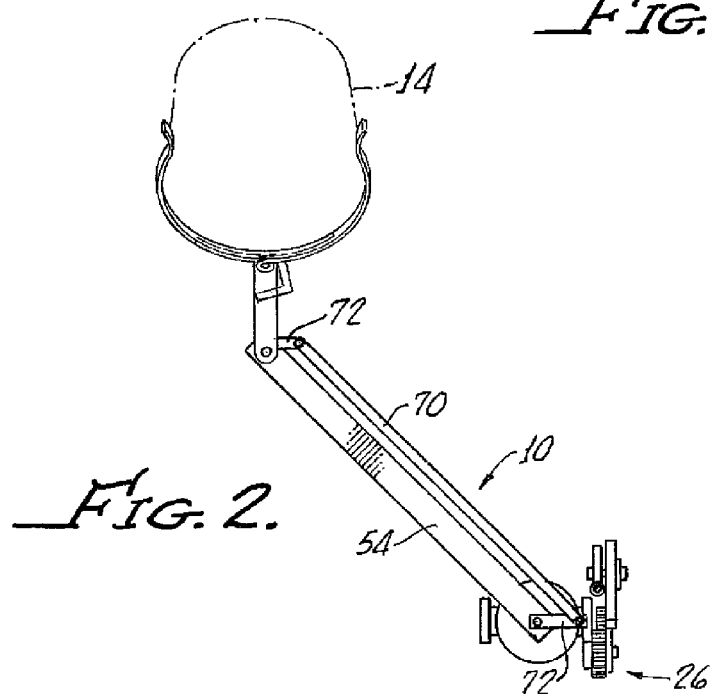
FIG. 2 is a view of the articulated arm shown in FIG. 1 taken along the line 2-2.

The gear arrangement provides for raising the arm mechanism 34 with respect to the boom 30, rotating the arm mechanism 34 with respect to the boom 30 and inverting the engaging device 18 and receptacle 14 during raising of the arm mechanism 34, as illustrated in FIGS. 1-4. As best shown in FIGS. 1 and 2 arm mechanism 34 translates the receptacle 14 sideways so that the arm mechanism 34 can be mounted to the front of a trash truck (not shown) the back of a front loader bin, not shown, or any place else that an arm would normally located on a trash truck (not shown). Because the boom 30 is of conventional hydraulic design, the arm mechanism 34 can be changed very quickly with the use of hydraulic quick disconnects (not shown).

Importantly, the receptacle 14 is in alignment with the boom 30 when it is extended, thus, putting less stress on the boom 30. This enables a greater extended reach without having to make the overall structure excessively heavy.

The gear arrangement 26 in accordance with the present invention is best shown in FIGS. 8 and 9 and includes a crown gear 38 disposed at a distal end 42 of the boom 30 fixed to a transverse axis and rotatable about a crown gear axis 50 with an arm 54 fixed to the crown gear 38 along with a drive gear 58 for rotating the transverse axis 46 and raising the arm 54, as indicated by the arrow 62.

As best seen in FIG. 9, a sun gear 66 is fixed to the transverse axis 46 for engaging and rotating the crown gear 38 with the arm 54 upon rotation of the transverse axis 46. This causes translation of the arm as shown in FIG. 2 and inversion of the receptacle 14 through an inverting rod 70 through hinges 72, 74 coupling between the arm 54 and the inverting rod 70.

With reference again to FIGS. 8 and 9, a lever gear 76 is provided for rotating the drive gear 58 upon movement of a drive rod 82 and interconnecting lever 86.

As shown in FIG. 4, horizontal displacement $D_h$, is provided by the hydraulically operated boom 30 for enabling grasping of the receptacle 14 at the various spaced apart distances from the boom which may also be pivot 90 mounted to enable angular displacement as indicated by the arrow 92 in FIG. 4 by a piston 94.

As best illustrated in FIG. 6, the engaging device 18 may be of any conventional design for enabling closure about the receptacle 14 including grips 96 which are hinge 98 mounted to a forearm 102 in turn attached to the arm 54. Pressure of the receptacle 14 against the grips 96 causes crab-like closure about the receptacle 14 in a conventional manner. Secure attachment between the receptacle 14 and engaging device 18 upon inversion of the receptacle 14 is provided by the hook 22 which is mounted via a pivot 106 to the forearm 102 which, in turn, is attached to the arm 54. Operation of the hook 22 is illustrated in FIGS. 1, 3, and 4. FIG. 7 illustrates the hook 22 in an engaged position with the receptacle 14 shown in solid line and a disengaged position shown in broken line.

Gravity operation of hook 22 during raising and lowering of the receptacle 14 is provided by a weight 110 extending outwardly from one end 114 of an elongated member 116 having a bend 120 on an opposite end 122 of the member 116. The pivotable engagement and disengagement of the hook 22 with the receptacle 14 occurs automatically through the force of gravity as the receptacle 14 is inverted as best shown in FIGS. 1 and 2.

Although there has been hereinabove described a specific articulated lift arm in accordance with the present invention for the purpose of illustrating the manner in which the invention may be used to advantage, it should be appreciated that the invention is not limited thereto. That is, the present invention may suitably comprise, consist of or consist essentially of the recited elements. Further, the invention illustratively disclosed herein suitably may be practiced in the absence of any element which is not specifically disclosed herein. Accordingly, any and all modifications, variations or equivalent arrangements which may occur to those skilled in the art, should be considered to be within the scope of the present invention as defined in the appended claims.

What is claimed is:

1. An articulated lift arm assembly for a refuse receptacle, the arm assembly comprising:
   an engaging device for releasably grasping the receptacle;
   an extendable boom;
   an articulated arm mechanism interconnecting the boom and the engaging device;
   a gear arrangement coupling the boom and the arm mechanism for raising the arm mechanism with respect to the boom, rotating the arm mechanism with respect to the boom during raising of the arm mechanism and inverting the engaging device and receptacle during raising of the arm mechanism, the gear arrangement including a crown gear disposed at a distal end of the boom, fixed to a transverse axis and rotatable about a crown gear axis, an arm of said articulated arm mechanism being fixed to said crown gear, and a drive gear for rotating said transverse axis with said crown gear for raising the arm mechanism; and
   a gravity operated hook for latching the receptacle when the receptacle is inverted to prevent undesired release of the receptacle from said engaging device.

2. The assembly according to claim 1 wherein the hook is pivotably mounted to the arm and includes an elongate member with a weight on one end of the elongate member and a bend at another end of the elongate member.

3. The assembly according to claim 2 wherein said bend is shaped for engagement with a receptacle rim upon pivoting of the hook.

4. The assembly according to claim 3 wherein said weight extends outwardly from said elongate member in a direction opposite to a bending direction of said bend.

5. The assembly according to claim 4 wherein said gear arrangement comprises:
   a crown gear disposed at a distal end of the boom and fixed to a transverse axis and rotatable about a crown gear axis, an arm of said articulated arm mechanism being fixed to said crown gear; and
   a drive gear for rotating said transverse axis with said crown gear for raising the arm.

6. The assembly according to claim 5 wherein said gear arrangement further comprises a sun gear fixed to said transverse axis for engaging and rotating said crown gear with the arm mechanism upon rotation of said transverse axis.

7. The assembly according to claim 6 wherein said gear arrangement further comprises a levered gear for rotating said drive gear.

8. The assembly according to claim 7 wherein said articulated arm mechanism includes a forearm hinged to a distal end of said arm mechanism and said gear mechanism further comprises an inverting rod disposed in a parallel relationship with said arm mechanism and fixed to the forearm and the crown gear axis for causing translational movement of the inverting rod, with respect to the arm mechanism as said arm mechanism is rotated, and inversion of said forearm.

9. An articulated lift arm assembly for a refuse receptacle, the arm assembly comprising:
   an engaging device for releasably engaging the receptacle;
   an extendable boom;
   an articulated arm mechanism interconnecting the boom and the engaging device; and
   a gear arrangement coupling the boom and the arm for raising the arm mechanism with respect to the boom, rotating the arm mechanism with respect to the boom during raising of the arm mechanism and inverting the engaging device receptacle during raising of the arm mechanism;

said gear arrangement comprising:
- a crown gear disposed at a distal end of the boom and fixed to a transverse axis and rotatable about a crown gear axis, an arm of said articulated arm mechanism being fixed to said crown gear; and
- a drive gear for rotating said transverse axis with said crown gear for raising the arm mechanism.

10. The assembly according to claim 9 wherein said gear arrangement further comprises a sun gear fixed to said transverse axis for engaging and rotating said crown gear with the arm mechanism upon rotation of said transverse axis.

11. The assembly according to claim 10 wherein said gear arrangement further comprises a levered gear for rotating said drive gear.

12. The assembly according to claim 11 wherein said articulated arm mechanism includes a forearm hinged to a distal end of said arm mechanism and said gear mechanism further comprises an inverting rod disposed in a parallel relationship with said arm mechanism and fixed to the forearm and the crown gear axis for causing translational movement of the inverting rod, with respect to the arm mechanism as said arm mechanism is rotated, and inversion of said forearm.

13. The assembly according to claim 12 further comprising a gravity operated hook for latching the receptacle when the receptacle is inverted to prevent undesired release from said engaging device.

14. The assembly according to claim 13 wherein the hook is pivotably mounted to the arm and includes an elongate member with a weight on one end of the elongate member and a bend at another end of the elongate member.

15. The assembly according to claim 14 wherein said bend is shaped for engagement with a receptacle rim upon pivoting of the hook.

16. The assembly according to claim 15 wherein said weight extends outwardly from said elongate member in a direction opposite to a bending direction of said bend.

* * * * *